US 6,693,558 B2

(12) United States Patent
Hedrick

(10) Patent No.: US 6,693,558 B2
(45) Date of Patent: Feb. 17, 2004

(54) AIRCRAFT FLAT PANEL DISPLAY SYSTEM

(75) Inventor: Geoffrey S. M. Hedrick, Malvern, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 214 days.

(21) Appl. No.: 10/020,784

(22) Filed: Dec. 14, 2001

(65) Prior Publication Data

US 2003/0058136 A1 Mar. 27, 2003

Related U.S. Application Data

(60) Provisional application No. 60/299,108, filed on Jun. 18, 2001.

(51) Int. Cl.[7] .............................................. G01C 21/00
(52) U.S. Cl. ........................ 340/971; 340/971; 714/38; 714/41; 717/128; 717/130
(58) Field of Search ................................ 345/116, 136; 701/3, 9, 14; 340/945, 963, 971; 717/127, 128, 130; 714/38, 41

(56) References Cited

U.S. PATENT DOCUMENTS

| | | | | |
|---|---|---|---|---|
| 5,541,863 A | * | 7/1996 | Magor et al. ............... | 364/580 |
| 6,071,316 A | * | 6/2000 | Goossen et al. ............ | 717/4 |
| 6,232,932 B1 | * | 5/2001 | Thorner ..................... | 345/1 |
| 6,311,327 B1 | * | 10/2001 | O'Brien ..................... | 717/4 |
| 6,401,013 B1 | * | 6/2002 | McElreath .................. | 701/3 |

* cited by examiner

Primary Examiner—Brent A. Swarthout
(74) Attorney, Agent, or Firm—Cohen, Pontani, Lieberman & Pavane

(57) ABSTRACT

A flat panel display system for an aircraft display includes a graphics rendering computer for rendering of anti-aliased graphical imaging data derived from aircraft sensors for full-field imaging on a cockpit display screen. A comparator processor independently generates, from the same sensor data, a selected subset or "points of light" of the display screen image and compares the points of light data to the data generated by the rendering computer for the same display screen pixel locations. The minimized processing requirements and simplified design of the comparator processor enable ready FAA certification of the comparator processor, whereas the extreme complexity and processing operations required of the rendering computer make FAA certification thereof unusually time consuming and expensive. The comparator processor checks a meaningful subset of the imaging data generated by the rendering computer for each display refresh scan and thereby obviates the need for the otherwise-required level of rendering computer certification that is impractical or unavailable. The rendering computer may be implemented by commercial single-board personal computer hardware with a replaceable graphics processor to enable ease of use of improved components.

38 Claims, 6 Drawing Sheets

TWO PANEL SYSTEM CONFIGURATION

SYMBOL GENERATOR ARCHITECTURE

VIDEO COMPARATOR ARRAY

AIRCRAFT FLAT PANEL DISPLAY SYSTEM

RELATED APPLICATION

This application claims priority from U.S. Provisional Patent Application Ser. No.: 60/299,108, filed: Jun. 18, 2001.

BACKGROUND OF THE INVENTION

1. Field of the Invention

The present invention relates to flat panel flight instrument displays for use in aircraft.

2. Description of the Related Art

It is essential in the creation of graphical primary flight instruments for an aircraft that are to be used and relied upon by the flight crew that they be of ultra high reliability and integrity.

Currently, the Pilot Flight Display (PFD), Navigation Display (ND) and Engine/Electrical Display (ICAS) systems of an aircraft receive sensor data/inputs on all relevant parameters—about 100 pieces of data, the majority in the standard ARINC 429 serial format. This data is input to an image rendering Symbol Generator and is checked for reasonableness and validity. The parameters are then appropriately scaled to useable formats, and the commands to create various informational alphanumeric and graphical images for reporting the relevant data on a display screen viewable by the flight crew are executed using the scaled parameters; these commands include graphical primitives such as points and lines, pointer, arc, polygon and fill commands, and alphanumeric characters. A typical display is produced by thousands of such commands that are executed on the order of 100 times every second. Each of these generated graphical primitives or primitive command elements must then be rotated, translated and their color (e.g., red, blue, green) modified or changed or varied in response to the data signal values received by the Symbol Generator. The creation, orienting and positioning of these graphical features for imaging on a screen display require thousands, and commonly tens or hundreds of thousands, of lines of computer code. Once oriented and positioned, each primitive element is then rendered by calculating individual display field textels (points) and placing them into an 8 million byte pixel map in the video RAM, which is refreshed on the order of 100 times per second. The data fed to the graphical display screen must also be anti-aliased to smooth the generated image lines and thereby present to the flight crew a display that is both easy to read and interpret and which rapidly conveys the information that it is intended to represent. Anti-aliasing of display data, however, is extremely computationally intensive—typically 800 billion instructions/second—since it is necessary to compute the locus of points along each line, arc, etc. and the intensity levels of the adjacent pixels (i.e those pixels adjacent to the computed data points) for smoothing of the graphical lines and images to be displayed. To avoid this high computational overhead many such displays use principally-vertical scales which do not require anti-aliasing of the image lines but which limit the ability of graphically-generated flight instruments to either graphically-depict (i.e. mimic) the conventional mechanical instruments with which the flight crew is familiar or present the flight instrument data in other convenient, legible, easily-utilized and readily-understandable formats.

The rapidly evolving computer processing and graphics display generation technology from the PC industry provides low cost and exceptionally powerful computing engines, both in CPUs like the Intel Pentium 4 and in special purpose 256-bit parallel rendering engines and the like from a multiplicity of companies. The availability of increasingly more powerful computing engines facilitates the implementation of ever more capable and complex display systems, since these new systems are capable of executing many more instructions (i.e. lines of code) per second. However, the size of this code and the complexity of the displays, especially in these new large formats, raises in the avionics industry the problem of having to test all code intended for use on an aircraft to the exacting standards required by the FAA (Federal Aviation Administration) for flight critical airborne equipment in order to certify the new and improved processor and display subsystems for permitted use on aircraft. The hundreds of thousands of instructions that are executed by such equipment to format and display the critical flight data are required by the FAA to undergo exhaustive, carefully-documented testing that commonly takes 5000 man-months for even relatively modest changes to previously-certified systems. Moreover, the low-cost, high performance hardware that is widely available to the public from the PC industry cannot currently be used in conventional aircraft instrumentation systems, because the design history and verification data for such hardware is not available from the manufacturer, and sufficient support data and testing has not been or will not be done by the manufacturer to demonstrate its operational reliability and design integrity.

Current aircraft instrumentation displays use typically dedicated processors and graphics rendering chips that have been specially designed for the particular application. FAA certification is based on a determination that both the hardware and the software of the display system have been thoroughly demonstrated, e.g. through extensive testing and documentation, to be operable in the intended aircraft flight deck environment and with the anticipated flight and environmental data without introducing unexpected errors or inaccuracies. Today, this generally requires that the history or heritage of the processor or chip design must be fully documented to the FAA and that the hardware and software must be tested by validating data flow through every pathway in the chip using the entire range of data—i.e. every single value—that the chip would be expected to handle during normal use on the aircraft. This process requires many, many months of testing. As a result, a manufacturer that wishes to periodically improve, for example, the graphics processor of an aircraft image rendering computer would spend virtually all of its time testing the new or improved chips. Despite the fact that current, widely-available, relatively inexpensive, off-the-shelf graphics processor chips are improved and become significantly more powerful and capable every 6 months or so, the specialty aircraft instrumentation processor chips and software used in these specialized aircraft displays are for practical reasons very infrequently updated or changed to thereby avoid the constant re-testing for re-certification that the FAA would require to adequately demonstrate the validity and integrity of the display data that they output.

Accordingly, there exists a need for an improved graphics display system for use in an aircraft and which can accommodate readily-upgradeable graphics display components and subsystems without adversely affecting existing FAA certification or requiring extensive recertification of the instrumentation display system.

SUMMARY OF THE INVENTION

An improvement over prior art aircraft instrumentation flight display systems and arrangements is provided by the present invention wherein a comparator processor is used in conjunction with a graphics rendering computer processor. The graphics rendering processor—from which the display presented to the flight crew is generated—is operative for generating, from data provided by a bank of sensors and other environmental and operating parameters and aircraft inputs, the various commands needed for rendering anti-aliased graphically-presented data images on a display screen and, as such, is implemented by a relatively complex apparatus and data processing engine. In accordance with the invention, a separate comparator processor is provided for independently calculating at least a selected plurality of data point display locations and values from the same sensors and input data from which the rendering processor generates the images that are to be displayed to the flight crew. The comparator processor then compares its calculated select data point values and locations to the corresponding data points that have been generated for display by the graphics rendering processor to determine whether such values and locations are the same and thereby test the reliability of the rendering processor generated graphical image for display. If the corresponding data does not successfully compare, then an error condition is determined to exist and, if the error condition remains after several comparator calculation or display refresh cycles or other predetermined interval, an error indication is displayed on the graphical display screen. Since the comparator processor output data is intentionally insufficient for providing a complete rendered screen display but, rather, is utilized only as an integrity check on the data produced by the graphics rendering computer, no anti-aliasing functionality is required of the comparator processor. This, coupled with the preferred and intended operation of the comparator to calculate only the limited number of select data points used in the comparison, permits the use of a notably simplified comparator processor that requires far less processing power and fewer executable commands to provide its data processing and comparison functions than does the graphics rendering processor by which the image for display is generated. As a result, expeditious FAA certification of the comparator is attainable. The use of a comparator processor as a check on the integrity of the graphics rendering processor data also permits the ready substitution of upgraded rendering engine graphics processors as such components and systems become available without extensive, if any, subsequent testing and documentation to obtain FAA recertification since the associated comparator processor will generally remain unchanged.

In a preferred embodiment, duplicate flat panel display systems, each correspondingly constructed and operating in accordance with the invention, are mounted in an aircraft cockpit for independently supplying graphical data representations to a pilot and a co-pilot and/or other members of the flight crew, each of whom is thereby provided with a separate and independently-addressed display screen. In the event that an error in the rendering processor data is detected as a result of the comparison of that data with the select data points generated by the comparator processor of one of those display systems, the other display system can thereafter provide graphical imaging data to both the pilot and co-pilot display screens to thereby replace the data determined to be in error or, if necessary, to replace a larger portion of or the entire display screen field.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE CURRENTLY PREFERRED EMBODIMENTS

Figure 1:
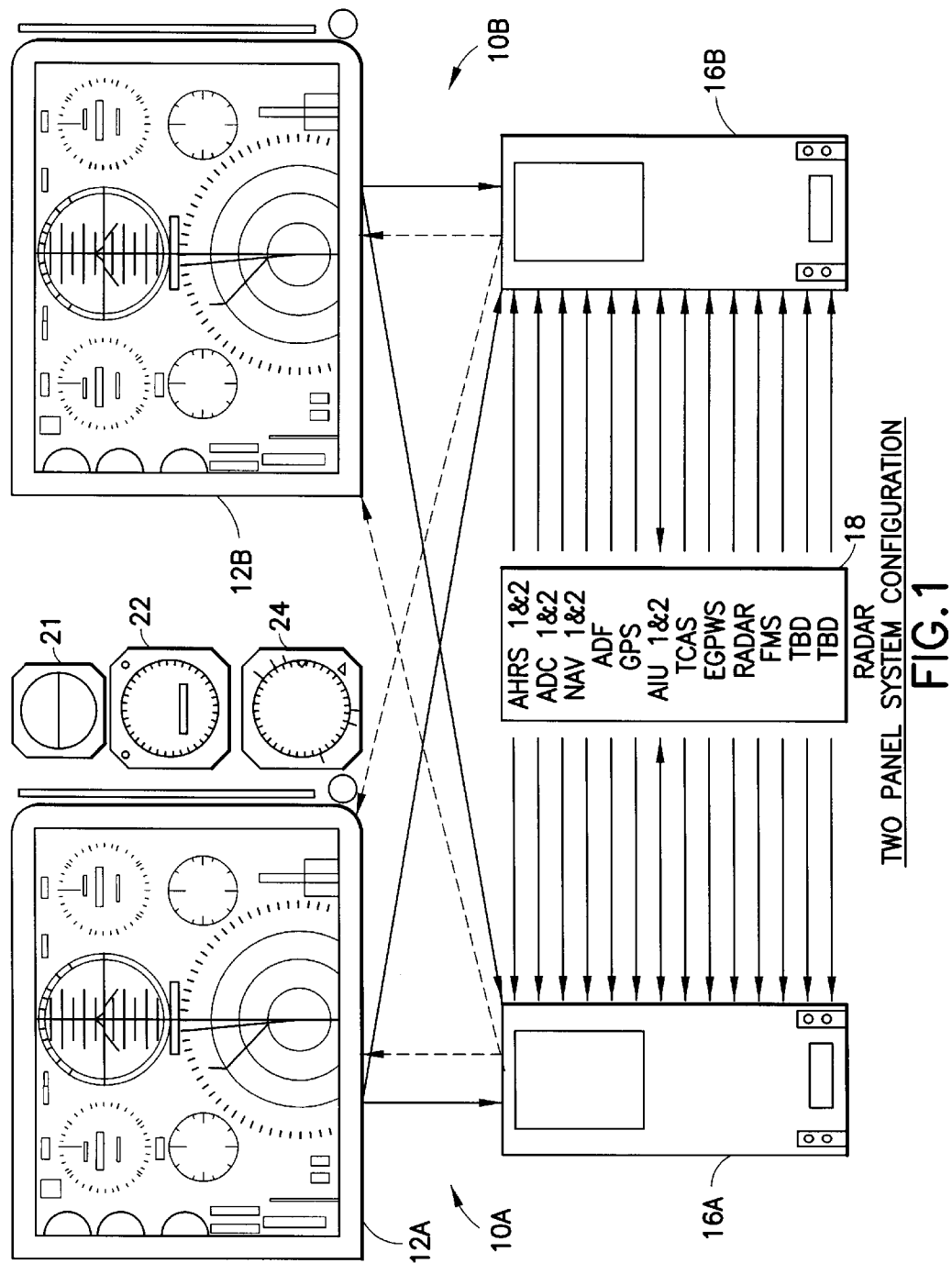
FIG. 1 is a block representation of a pair of flat panel graphics displays forming a dual aircraft cockpit display system in accordance with the present invention.

FIG. 1 depicts a currently preferred implementation of an aircraft flight panel dual display system constructed in accordance with the present invention. Dual control stations, e.g. a pilot station and a co-pilot station, are generally present in commercial aircraft and, accordingly, a first display system 10A and a second display system 10B are shown. In the herein-disclosed preferred embodiment of the inventive system, the display systems 10A and 10B are functionally and structurally alike and equivalent to each other. For convenience and ease of description, a single such system, generically designated by reference number 10, will be described and discussed herein. It will in any event be appreciated that the invention is equally applicable for use in aircraft equipped with only a single display system 10 and, indeed, the use of a pair of the inventive systems in an aircraft (as shown in FIG. 1) is but one particular implementation and contemplated application of the invention.

Display system 10 includes a display screen 12 such as a liquid crystal display (LCD) or other illuminatable or otherwise viewable imaging display, either specially designed and constructed or, as for example known in the art, containing an array of individually-addressable pixels (i.e. picture elements) capable of operatively generating light at a range of selectively controllable intensity levels. Each pixel in the display has a corresponding address at which it can be individually accessed by control signals to graphically depict, in combination with other display pixels, images such as pointers and other indicators, simulated flight instruments and gauges, maps, terrain simulations, alphanumeric characters, etc. on screen 12, as is known in the art, and is further capable of displaying or radiating a color component such as red, green or blue (RGB values) or combinations thereof. In each display system 10 a dedicated symbol generator or controller 16 generates and outputs calculated imaging data that is used to illuminate the appropriate pixels in the respective or corresponding display screen 12 and thereby create the intended images on that display. The imaging data is derived or calculated by the controller 16 from sensor measurements and other input data and the like which is obtained from a plurality of aircraft and environmental sensors or inputs or other aircraft systems, collectively referred to herein as the sensors or sensor bank 18, disposed about and throughout the aircraft for ascertaining or "reading" the current values of often dynamically-varying flight control, telemetry, atmospheric, positional, and other aircraft and environmental condition information. The flight control reading and sensor systems may illustratively include or provide, by way of typical but nonlimiting example, altitude, heading and reference (AHRS) data; altitude, direction and control (ADC) data; navigational (NAV) data; automatic direction finder (ADF) data; global positioning system (GPS) data and devices; aircraft interface unit (AIU) data and devices; traffic alert and collision avoidance system (TCAS) data and devices; enhanced group proximity warning system (EGPWS) data and devices; and flight management system (FMS) data. As shown in FIG. 1, the display system 10 may also include or be disposed proximate or used in conjunction with one or more conventional backup or otherwise additional mechanical gauges or instruments, such for example as an attitude indicator 21, an altitude indicator 22 and an airspeed indicator 24.

The dual display systems 10A and 10B are simultaneously operated and operational such that a controller 16A provides data for rendering of images on display screen 12A (e.g. the pilot station), and a like controller 16B provides data for rendering of images on display screen 12B (e.g. the co-pilot station). As explained more fully below, a routing function or capability of the inventive system allows the data from either controller to be displayed on either or both display screens so that, in the event of a malfunction or other partial or complete failure of one of the controllers 16A, 16B, the other or remaining operational controller may concurrently provide imaging data to both displays 12A and 12B. This feature is indicated in FIG. 1 wherein each of the controllers 16A, 16B is shown in communication with both display screens 12A, 12B.

Figure 2:
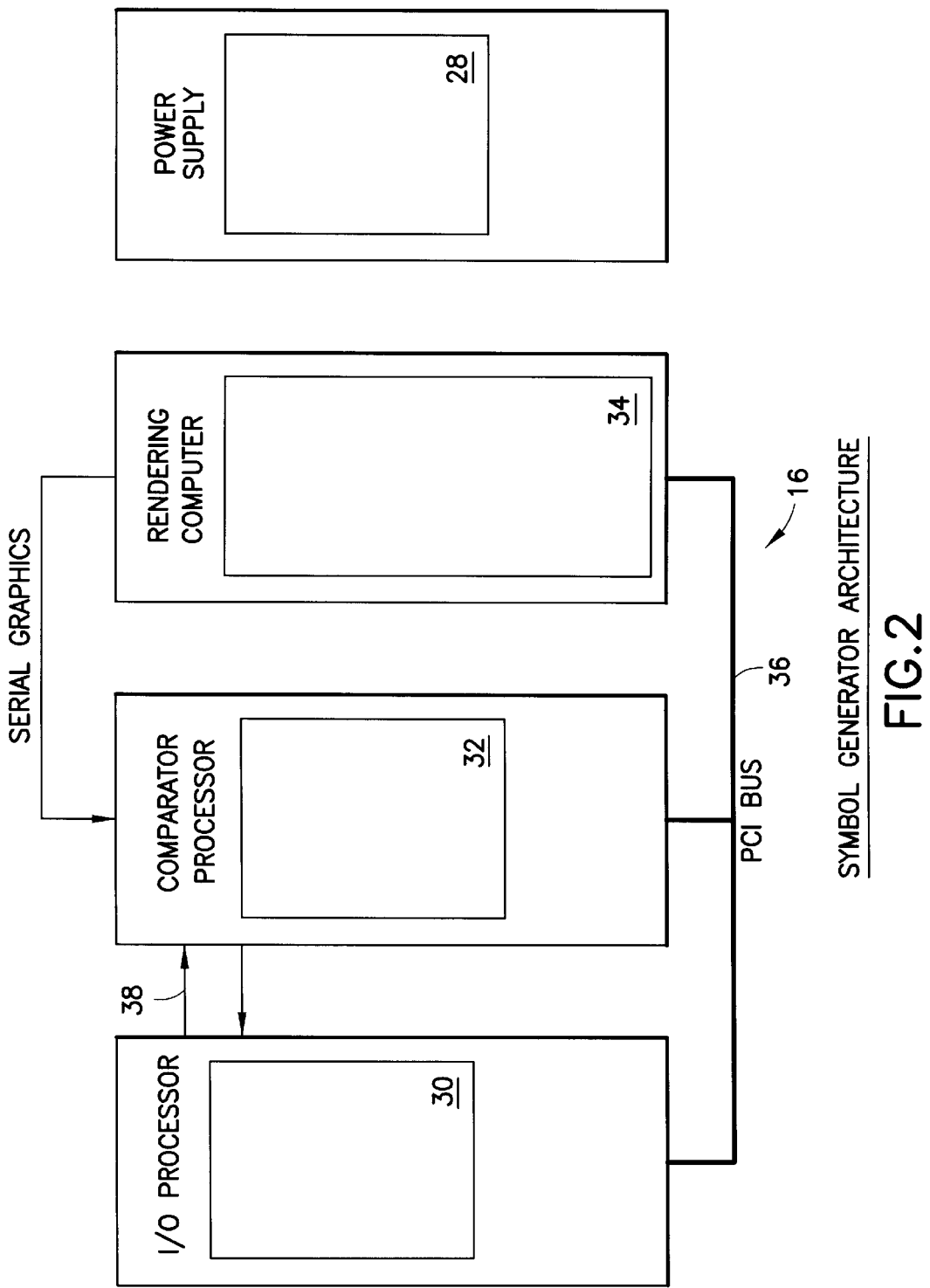
FIG. 2 is a block diagram of the symbol generator architecture of the present invention.

With reference now to FIG. 2, each symbol generator or controller 16 includes an I/O processor 30, a comparator processor 32 and a rendering computer 34 communicating with each other via a conventional PCI bus 36. Other bus designs or implementations may alternatively be employed, although as will be apparent from this disclosure the use of a conventional bus design of common use in the personal computer industry provides particular advantages in the context of the invention for, inter alia, readily accommodating data transfer interconnection among the various components of the inventive system as shown in FIG. 2 including, in particular, the rendering computer 34. I/O processor 30 receives or reads serial data from the aircraft sensors 18, and that data is placed in a storage buffer of I/O processor 30 for access by the comparator processor 32 and rendering computer 34 via PCI bus 36. In the currently preferred embodiment, I/O processor 30 incorporates or utilizes a Motorola 8240 microprocessor and has 32 discrete inputs and 8 discrete outputs for communicating data between the sensors 18, the comparator processor 32, the rendering computer 34 and the display screens 12A and 12B. It is anticipated that the I/O processor 30 will have successfully undergone highly intensive FCC verification and validation testing—meaning (as is well known in the art and aircraft instrumentation industry) that every hardware and software pathway and instruction has been tested using the full range of data to which the I/O processor is expected to be exposed during operational use. A parallel port bus 38, implemented using by way of example the known IEEE 429 bus architecture, is also provided for redundancy and to assure continued communication ability between the controller components of the inventive system 10 in the event of a temporary or partial error condition or failure of the PCI bus 16. A power supply 28 is also provided, either as a part of or for use with the inventive system, for supplying operating power to the I/O processor 30, comparator processor 32 and rendering computer 34.

Figure 3:
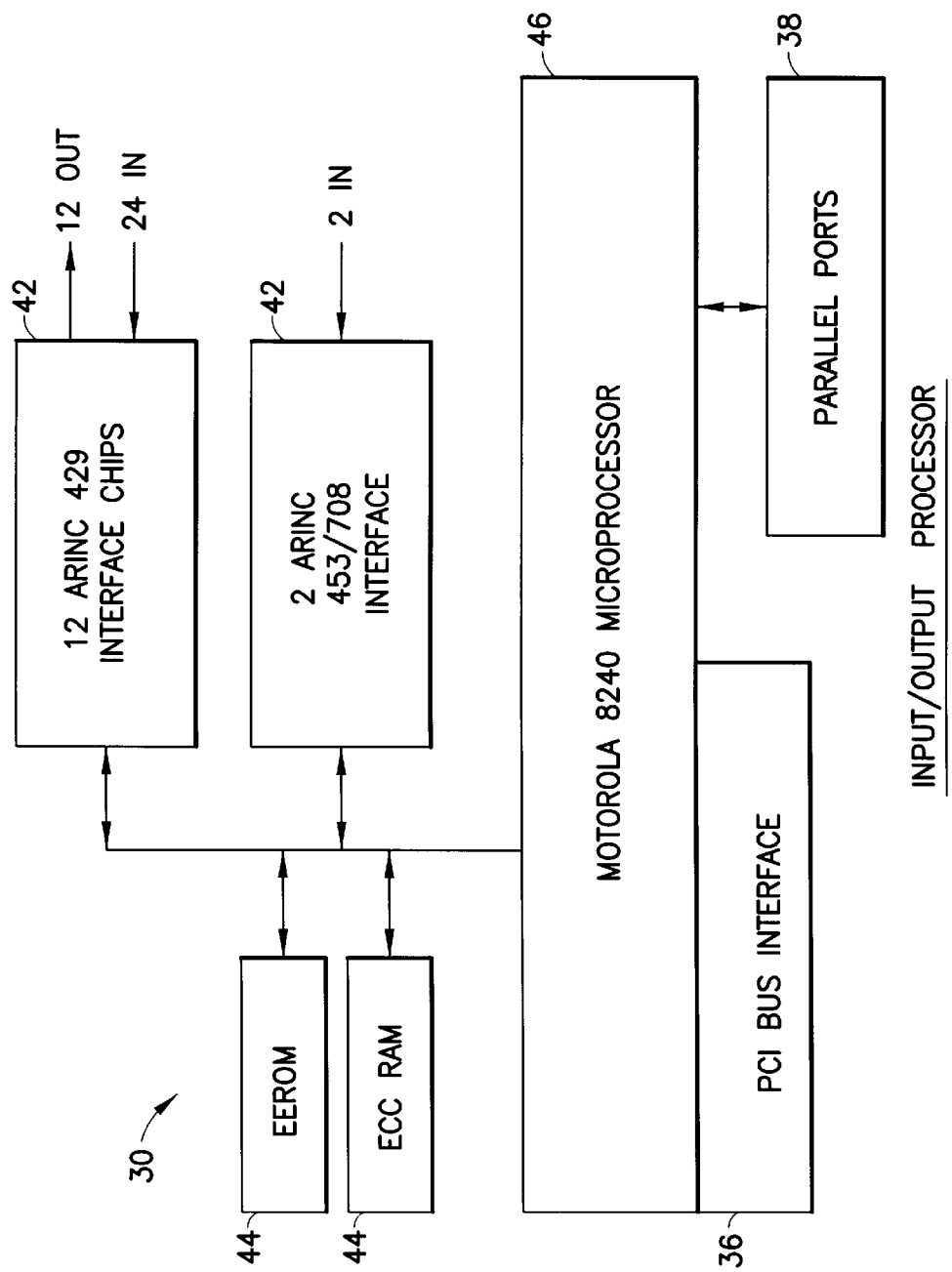
FIG. 3 is a block diagram of the input/output (I/O) processor of the system of FIG. 2.

A block diagram of I/O processor 30 is presented in FIG. 3, wherein interface components (as for example in the form of one or more integrated circuit chips) 42 convey data to and from the I/O processor, and then to the comparator processor 32 and rendering computer 34, through the PCI bus 36 and parallel ports 38 under the control of microprocessor 46. Processing variables are stored in EEROM and ECCRAM memory 44. It should however be understood that the particular design utilized in implementing the I/O processor 30 is primarily a matter of design choice and therefore may, without otherwise affecting the scope and operation of the invention, considerably vary from that shown in FIG. 3 and described herein by way of currently preferred example, so long as the I/O processor 30 implements the basic functionality of providing the appropriate sensor and input data to the rendering computer 34 and comparator processor 32 for operation of the inventive display system.

Figure 4:
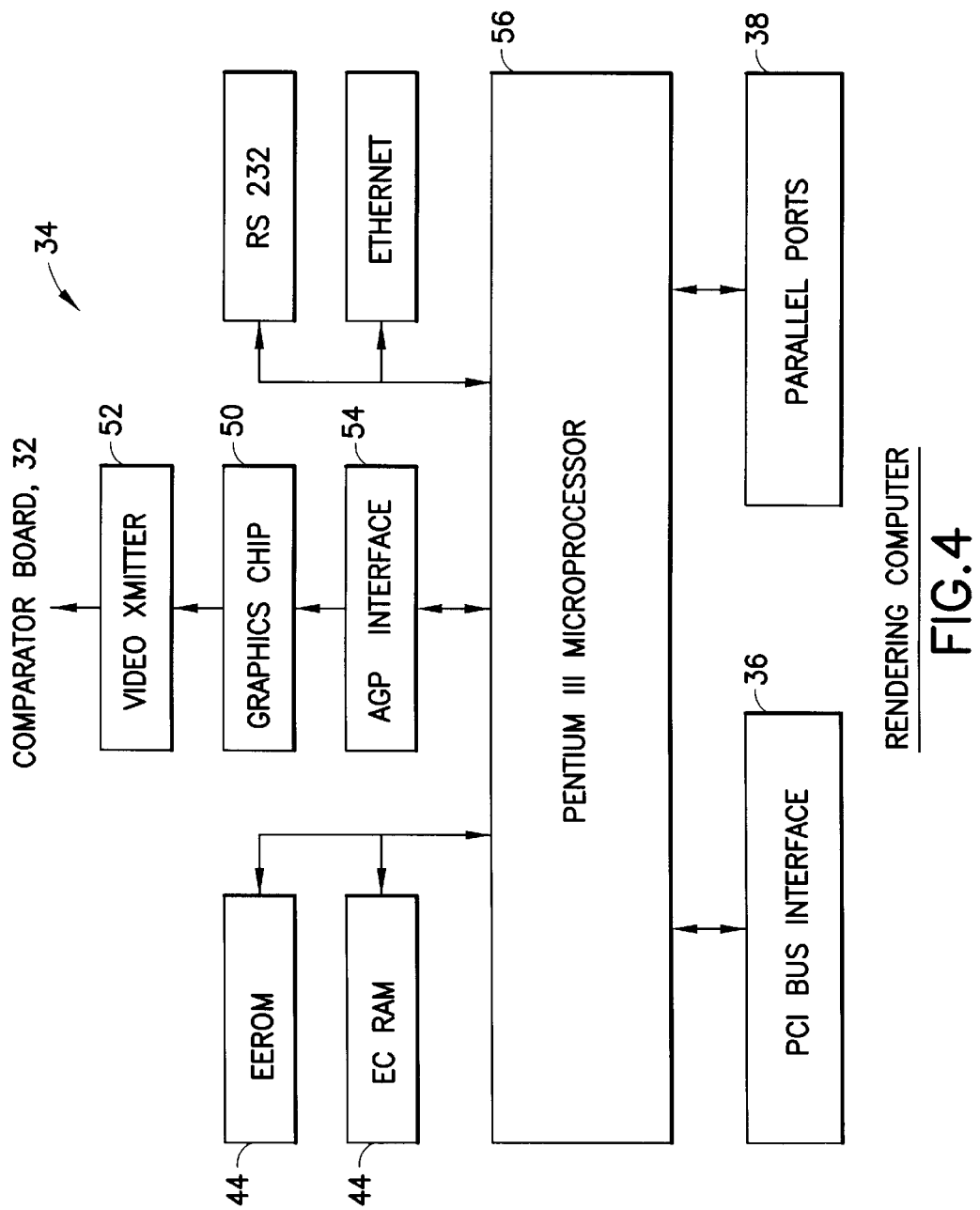
FIG. 4 is a block diagram of the graphics rendering computer of the system of FIG. 2.

The imaging data for presentation on the cockpit-disposed LCD display 12 is generated by the rendering computer 34 which may, in a preferred embodiment based on currently available technology in the personal computer marketplace, be implemented by a substantially conventional single board, PCI-bus, so-called IBM-compatible computer that includes, as shown in FIG. 4, a graphics processor 50 in communication with a video transmitter 52 and an accelerated graphics port (AGP) interface 54. The video transmitter provides rendered video data to the comparator processor 32 for comparison to select data test points (herein designated "points of light"), as explained below, and for imaging of the rendered data on the display screen 12. The single board rendering computer 34, which also includes a microprocessor 56 such as an Intel Pentium III or Pentium IV microprocessor, or a Motorola 750 microprocessor, is in currently most preferred forms of the invention an essentially off-the-shelf, commercially available, conventional motherboard-based personal computer—i.e. a computer not in general specially designed and constructed of customized components which have been expressly manufactured for the imaging of graphically-rendered aircraft instrumentation and dynamic aircraft operating data and information. In particularly preferred embodiments, the graphics processor integrated circuit chip or components (and, optionally, its associated support chips and/or components) is mounted on a detachable mezzanine card that is carried on the computer motherboard for ready interchangeability and exchange of the graphics processor 50 as new and improved designs and capabilities of these conventional or commercial graphics processors become available. The graphics processor of the embodiment of the inventive system herein described provides 24-bit color pixel word output, i.e. 8-bits each for blue, red and green, which outputs (together with a clock signal) are fed to a parallel-to-serial converter and, thereafter, to the display 12. The single-board rendering computer 34 performs all of the processing of the data for generating and placing of the desired images on the display, including the anti-aliasing calculations required to yield a smooth graphical representation of the displayed data and images.

Key to the present invention is the provision and use—for generating of the dynamically-changing, processor-intensive, fully anti-aliased images to be placed on the display 12 and that can then be utilized and relied upon by the flight crew to pilot the aircraft and maintain uninterrupted situational awareness of the operating characteristics and other essential information relating to the aircraft and the environment in which it is being operated—of a substantially conventional, commercially-available, off-the-shelf rendering computer 34 using the powerful microprocessors and graphics processors and supporting chip sets that are readily available in the marketplace at relatively low cost and which are regularly and frequently updated and improved. The ability to utilize such hardware, e.g. powerful, low cost Pentium-based single-board computers, and to periodically update at least the graphics processors thereof as new and more powerful and capable such processors become available in the marketplace, provides a tremendous and currently unrealizable advantage as contrasted with the heretofore-practiced use in aircraft display systems of specially custom-configured and designed graphics processors and display rendering subsystems and the like. These custom-designed processors are extremely costly to develop and are rarely changed once installed in an aircraft despite continued and regular advances in technology that support the design and implementation of new processors with many times the power and capabilities of those already in use. This problem has until now seemingly prohibited the approach of the present invention—i.e. the use of such off-the-shelf hardware—because of the virtual impossibility of demonstrating to the satisfaction of the FAA that such conventional, commercially-available, general-purpose computer systems will provide the error-free operation and high integrity required to justify reliance by the flight crew on their graphically rendered and displayed flight data in piloting of a commercial aircraft carrying, often, hundreds of passengers. For example, even if a manufacturer of an aircraft flight information graphical display system were to demonstrate to the FAA that a system based on such a commercially-available single-board computer would accurately process and image data for every possible range of inputs encountered (or expected to be encountered) by an aircraft, the manufacturer could not also provide the FAA with data detailing the historical development or heritage of the hardware as is required for full FAA certification of such graphical aircraft instrumentation display systems to assure system reliability, since hardware defects, as well as software or processing defects, can just as readily result in the display of erroneous or inaccurate information.

The present invention overcomes this seemingly unsolvable problem by providing a system that is operative to continuously assure the integrity, validity, reliability and accuracy of the information generated by the rendering computer for display on the display 12 through use of the associated comparator processor 32. In contrast to the rendering computer 34, the comparator processor 32 is preferably based on a specialized, custom design and is intended to be fully certified by the FAA using the most demanding tests and test procedures that are currently required for aircraft data graphical rendering display systems. This level of FAA certification testing is commonly referred to as modified condition decision coverage (MCDC). Thus, in accordance with the invention, confirmation of the reliability of the display data generated by the rendering computer 34 is provided by the comparator processor 32 which, prior to imaging on display 23 of the graphically-rendered information that is generated by rendering computer 34, operatively verifies a meaningful subset of the rendering computer display data to thereby dynamically assure the current and continued error-free operation and reliability of the rendering computer. The subset of display data subject to the verification process—those data points being sometimes referred to herein as the "points of light"—is specially selected to define a meaningful cross-section and set of the display data image parameters to achieve and assure the intended ongoing confirmation of error-free data reliability.

Accordingly, the impossible-to-attain need for high level FAA certification of the rendering computer 34 as implemented by the present invention is avoided by providing, in its stead, such high level certification of the comparator processor 32. The advantage to this arrangement is that, as contrasted with that of the rendering computer 34, the hardware and software of the custom-designed comparator processor 32 is of a relatively simplified construction (with respect to both its hardware and software aspects) and, as such, the time and effort required to satisfy the most-demanding of FAA certification procedures for the comparator processor 32 is orders of magnitude less than would be required to correspondingly certify the rendering computer—assuming that such FAA certification of the rendering computer 34 of the present invention were attainable under any circumstance. Moreover, because the comparator processor 32 is operable for processing and generating display data for only the so-called points of light, once certified and installed in an aircraft the comparator processor need not be modified or upgraded or otherwise changed or replaced if, as and when the rendering computer 34—or at least the graphics processor or subsystem of the rendering computer—is upgraded or replaced to take advantage of newly-available and/or more powerful or capable technology and chip designs. The data-verification functionality of the comparator processor 32, through comparison of the selected points of light with the display data for the corresponding display pixels as generated by the rendering computer, continues to provide a sufficient check on the rendering computer display data without regard to any enhanced processing power and/or capabilities that may be made available from the rendering computer by way of upgrades or replacements of or to the rendering computer.

The notably reduced complexity—as contrasted with rendering computer 34—of comparator computer 32 is the result of a number of factors. First, the comparator processor is operable for the processing and generating of display data for only a predetermined finite number of display points—i.e. the points of light—and as such its hardware and software is custom-designed and configured for correspondingly limited processing operations. Thus, unlike the rendering computer, which must generate the color and intensity data for imaging presentation at each and every one of the pixel locations on the display 12, the comparator processor only generates the color and intensity data for a limited, predetermined number of display pixels. For a currently-contemplated flat panel LCD display screen of 9 by 12 inches having a resolution of 1024×768, for example, the rendering computer must provide the image data for about 800,000 pixels and update that image data a hundred times each second. The number of points of light for which the comparator processor is required to generate display data for each such display update interval, on the other hand, will preferably be on the order of several hundred pixels. In addition, since the comparator processor operatively calculates the display data for only a finite number of selected points of light located selectively about the field of display 12, it is unnecessary for the comparator processor to perform any anti-aliasing processing in its calculation of the points of light display data. Anti-aliasing processing routines are highly complex and processor-intensive and the omission of anti-aliasing processing in the comparator processor notably simplifies the construction and operation of its custom-designed hardware and software.

Thus, in accordance with the invention a second computer, namely the comparator processor 32, is likewise connected to PCI bus 36. Comparator processor 32 receives from I/O processor 30 the same sensor inputs and data as does rendering computer 34 but has significantly less intensive and demanding data generating requirements as compared to the rendering computer. Instead of generating the data necessary for imaging on display 12 all of the fully anti-aliased, alphanumerically and graphically-presented information upon which the flight crew is intended to rely in operating the aircraft, as is required of rendering computer 34, comparator processor 32 generates the display data for only a limited number—as for example between about 100 and 300—of specific data points which are used as test or integrity check points for verifying the accuracy of the display data that is generated by rendering computer 34. It is preferred and generally intended that these "points of light" be selected to coincide with a representative set of points located at positions throughout the display field at which data for important aircraft and environmental and situational parameters and indications are being imaged at each periodic refresh of the display. Thus, it is desirable to include in the selected points of light a plurality of display pixels that are being activated by the rendering computer data to image parts of one or more of, by way of illustrative example, alphanumerically-presented information, graphically-defined pointers and other indicator lines of graphically-imaged flight instruments and gauges and the like, graphical lines and/or alphanumeric characters of numeric scales, portions of graphically-imaged map or chart lines or features, and other dynamically-updated display elements. Some points of light may also be selected to correspond to predetermined static (or otherwise less frequently changing) portions of the display field, such as on or along graphically-presented flight instrument borders or other generally static display features or elements.

What should, in any event, be understood and apparent is that the selected points of light will not in general (or at least for the most part) correspond to specific, fixed, unchanging, predetermined pixel locations on the display 12; rather, they will primarily identify particular data display elements whose pixel positions or locations within the display field will often or from time-to-time change as the display image is repeatedly refreshed or updated. Thus, for example, on the rotatable pointer of a graphically-imaged airspeed indicator three points of light—corresponding to the two ends and an equidistant or central or other predetermined location along the length of the pointer—may be defined and, as the position or rotated orientation of the pointer shifts with changing airspeed, the specific display pixel locations at which those three data points will be imaged will likewise change. Similarly, where certain data is alphanumerically presented a predetermined number of locations on each alphanumeric character may be selected as points of light, and the display pixel locations of those selected alphanumeric character data points will change as the alphanumeric character changes. Thus, where aircraft altitude is presented using alphanumeric characters at a particular location on the display, the selected points of light of the least significant digit for a graphically defined number "7"—such for example the two end points of the representation and the intersection of its connected legs—will always be presented at the same display pixel locations, but the display pixel locations of those points of light will change when the numeric character changes to, for example, a number "3" for which the designated points of light may be its two end points and the intersection of its two arc segments. Optionally, one or more selected additional points along the curved arc segments of the number "3" may also be defined as points of light for that digit, so that the number of points of light used to check the accuracy of an alphanumeric digit (for example) may change from update to update of the display field as a function of the particular digit being displayed. As will therefore be apparent, the exact number of points of light that are used in implementing the present invention may vary from scan to scan of the rendered display field as at least some of the data being imaged on the display changes from one screen update or refresh to the next.

Figure 5:
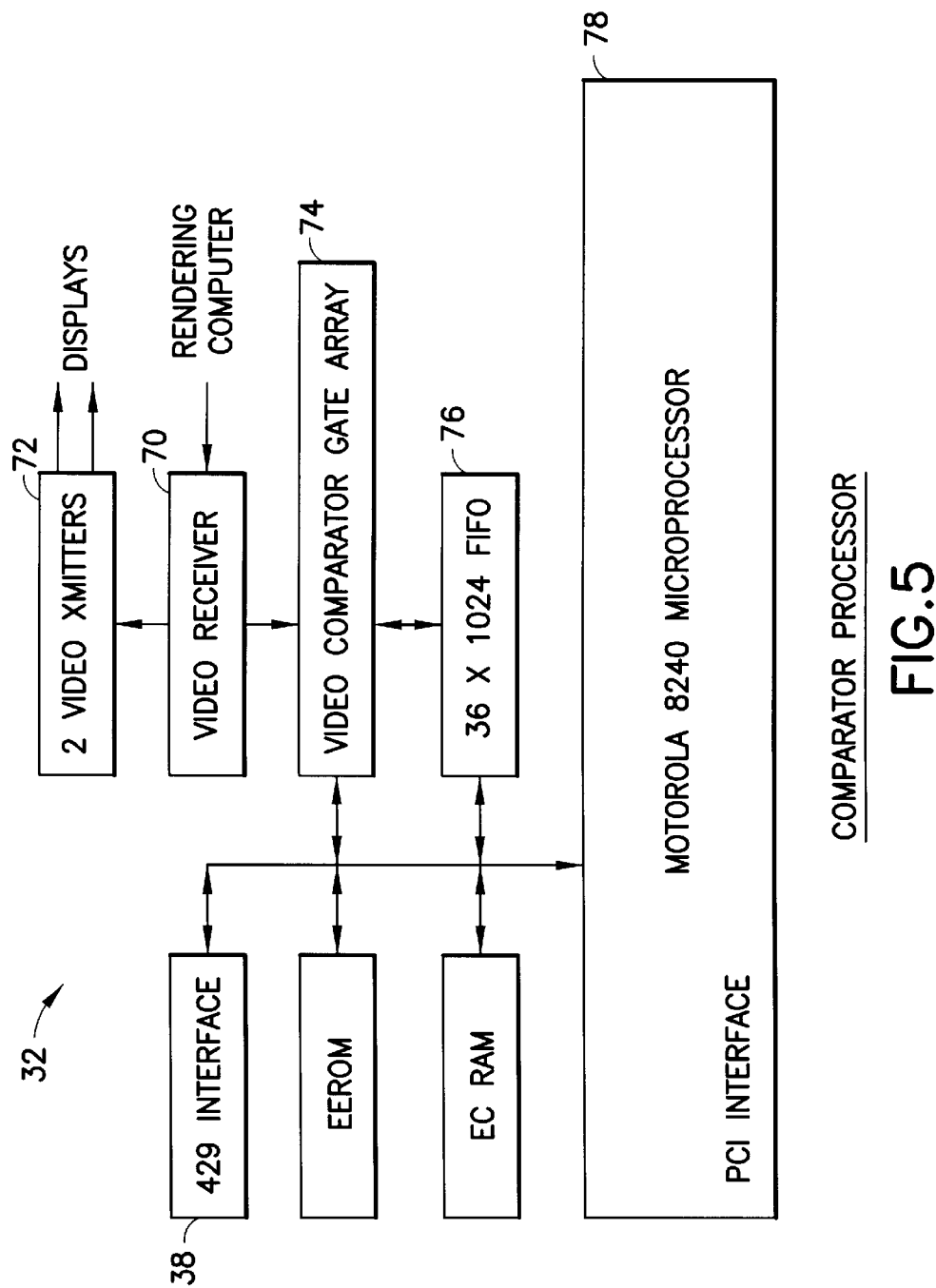
FIG. 5 is a block diagram of the comparator processor of the system of FIG. 2.

With reference now to FIG. 5, the comparator processor 32 receives the anti-aliased graphics imaging data from rendering computer 34 at a video receiver 70 which is connected to a video comparator gate array 74 and a pair of video transmitters 72—one transmitter 72 for feeding each of the displays 12A, 12B. As noted above, in the preferred embodiment each point of light generated by comparator processor 32 consists of three 8-bit bytes (one byte for each of the colors red, green and blue) for a total of 24 bits. The point of light data bits are stored in a FIFO stack 76 in communication with a microprocessor 78. The data stored in FIFO 76 for each point of light comprises the three 8-bit RGB color bytes and clocking data identifying the display screen pixel location at which that point of light should be displayed; the clocking data is used to synchronize the comparison of the point of light color data with the color data for the corresponding screen display location as generated by rendering computer 34. The data bytes for the points of light are loaded into FIFO 76 in the order in which they will be rendered on display 12 as the display image data is to be fed to the display, as for example by sequentially scanning or tracing across each horizontal trace line of the display field.

Figure 6:
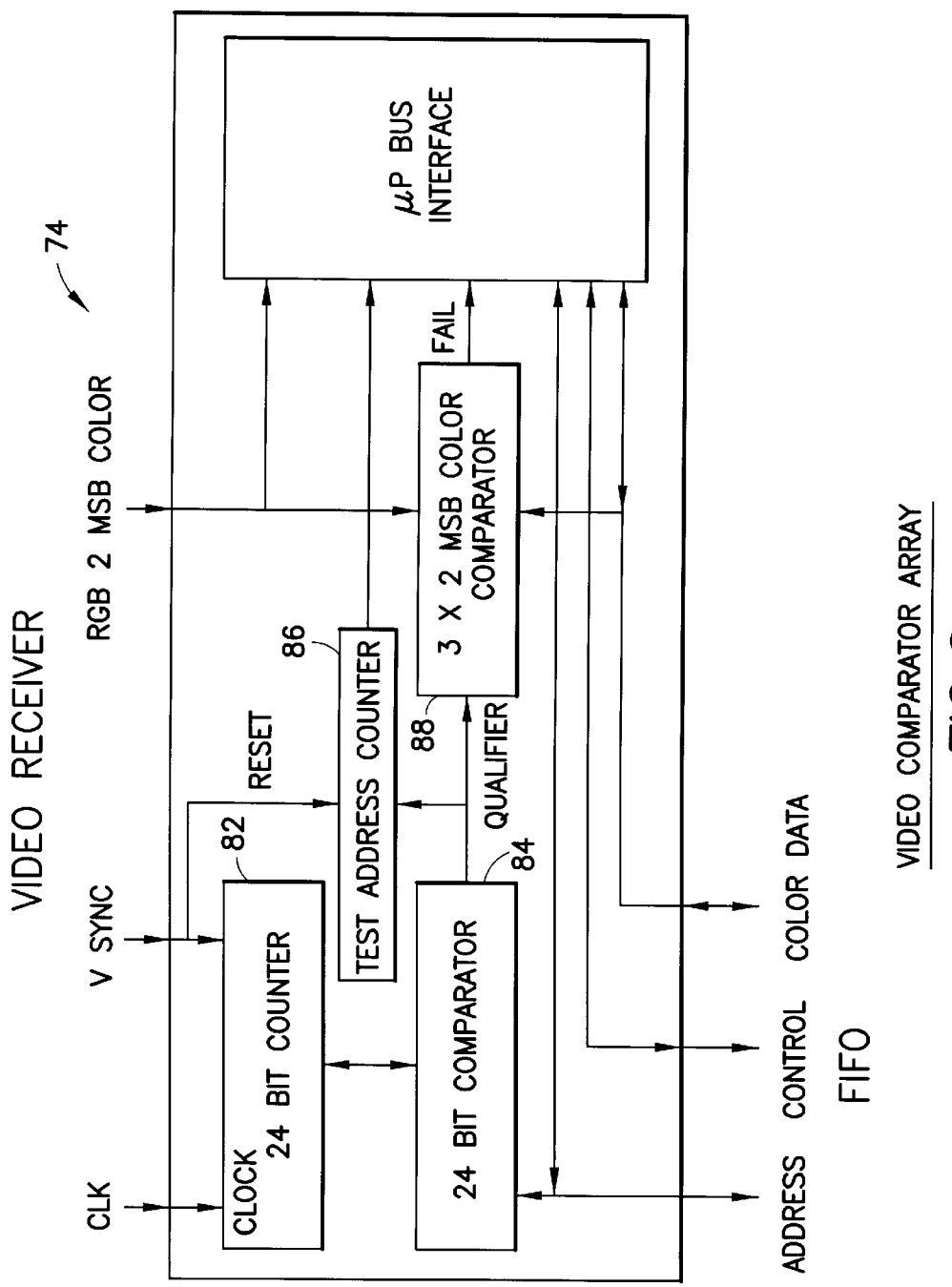
FIG. 6 is a block diagram of the video comparator array of the comparator processor of FIG. 5.

As shown in FIG. 6, a 24-bit counter 82 receives clock and vertical synchronization signals from video receiver 70 to identify the locations (i.e. the sweep addresses) on the screen display at which the rendering computer-generated imaging data is to be displayed. As the clock signal from the video receiver causes the counter 82 to cycle through each of the address locations that collectively define a complete imaging scan of the screen display 12, a 24-bit comparator 84 receives the current address from the counter 82 and, from FIFO 76, the intended display address of the next-available point of light data that is stored in the FIFO. When those two addresses match, comparator 84 enables a "qualifier" output to a color comparator 88 which then compares, for the current screen display location address, the RGB color data generated by rendering computer 34 for output to display 12 and the point of light data generated by comparator processor 32 and stored in FIFO 76. Thus, when comparator 84 determines that counter 82 holds the address of the screen display location of the next-available point of light data on top of the FIFO stack, it causes the color comparator 88 to compare the rendering computer-generated color data from video receiver 70 with the point of light color data stored at the top of the FIFO stack 76. Test address counter 86 sequences FIFO 76 so that the address and color data for the next point of light stored in the FIFO is now placed at the top of the stack for address comparison in comparator 84 and color data comparison in color comparator 88 as counter 84 continues to sequence through the screen data addresses of the rendering computer imaging data.

In currently preferred embodiments of the invention, color comparator 88 compares only the two most significant bits (MSBs) of each of the three (i.e. red, green and blue) 8-bit bytes of the color data generated by the comparator processor, on the one hand, and the rendering computer, on the other, for the same screen display pixel location. This comparison of only a part of each color information data byte is appropriate and yields a meaningful assessment of the reliability of the rendering computer data because the pixel color data generated by the comparator processor 32, unlike the imaging data that is output by rendering processor 34, is not anti-aliased. At any given display point or pixel location, anti-aliasing of the initially calculated data intended for display—through selective actuation of pixels adjacent to the given pixel location and a corresponding reduction of the intensity (i.e. color values) of the given pixel location to thereby smooth the resulting graphical image—may reduce the intensity of the given pixel location by as much as three-quarters (i.e. 75%) from the originally-calculated, aliased color values of one or more of the three color bytes. As a consequence, if at least the two MSBs of each of the three (red, green and blue) color data bytes generated by each of the rendering computer and the comparator processor for a given screen display pixel location are determined to be the same, then the rendering computer imaging data for that pixel location is deemed reliable.

Although it is currently anticipated, as described above in connection with the embodiments of the inventive system herein disclosed by way of preferred example, that only the two MSBs of each of the color data bytes will be compared in assessing the reliability of the imaging data generated by the rendering computer, it is within the intended scope and contemplation of the invention that additional bits of the color data bytes may be utilized in that comparison. Thus, by way of illustration, the four MSBs of each color data byte may instead be compared and, if necessary or appropriate based on the anti-aliasing algorithms or methodologies or characteristics being employed or on any other relevant aspects or factors, the manner in which the results of the color data comparison are evaluated for determining from such results the reliability of the corresponding rendering computer data may be suitably modified from that which is described herein. Any such changes in the various herein-illustrated and described elements and components and subsystems of the inventive system, and/or in their interconnections and operations, or otherwise in connection with the process steps for effecting the comparison or identifying a successful comparison or an error condition, that may be necessitated or desirable to accommodate such modifications will be apparent to, and are deemed to be within the normal abilities of, those having ordinary skill in the relevant arts.

As the imaging data generated by rendering computer 34 and serially fed to the video receiver 70 is successfully verified, via color comparator 88, against the points of light data generated by comparator processor 32 and stored in FIFO 76, the rendering computer data is directed from video receiver 70 through the video transmitter 72 to create the intended images on screen display 12. The video receiver converts the serial imaging data from the rendering computer to parallel form and buffers it for, respectively, presentation of the buffered RGB data for the selected (i.e. points of light) locations to the comparator array 74 and presentation of the buffered RGB data for the entire screen display field image to the video transmitter 72. Video transmitter converts the rendered parallel RGB data to serial form and directs it to the respective display 12.

It is generally contemplated that, under normal conditions, only one of the video transmitters 72 will be active to operate its respective display with the rendering computer imaging data. Nevertheless, the comparator processor 32 is preferably constructed so that, if necessary or desired, the imaging data generated by rendering computer 32 of one of the dual display systems on an aircraft can be used for concurrently operating both of the displays 12A, 12B through the respective video transmitters 72 of the rendering computer. This may be deemed appropriate or necessitated, for example, by a detected failure or error condition of the other symbol generator 16 as explained below.

If the color data comparison effected by color comparator 88 for a particular screen display pixel location determines that the rendering computer and point of light data are not the same, or are not otherwise within predetermined acceptable parameters of difference that predeterminately define a successful comparison, then a comparison failure or error signal is generated and provided to the microprocessor interface of comparator processor 32. Although the system logs each and every such comparison failure, in preferred implementations the system may delay further action (e.g. reporting of the error to the flight crew) on the detected comparison failure for a period of time sufficient to determine whether the failure is the result of a temporary or nonrecurring glitch in the sensor data or data calculations or, to the contrary, evidences a possible systemic or other continuing failure that renders the data being generated by the rendering processor for imaging on display 12 seriously suspect and unreliable. This delay may for example be effected by determining whether a comparison failure is identified for the same point of light data location over a predetermined plurality of display update cycles; since as currently contemplated the display is updated on the order of 100 times each second, the results of color data comparisons for each screen display location can be noted for a sufficient number of consecutive display updates to enable effective assessment of the error without endangering the aircraft or unacceptably delaying notification of a failure event indicative of unreliable rendering computer data. Thus, by way of illustration the identifying of five consecutive color data comparison failures for a screen location of a particular point of light—which will only involve a period on the order of 0.05 seconds—may in a particular implementation be deemed sufficient to indicate unreliability of the rendering computer data that includes the point of light location at which the comparison failure has repeatedly occurred. An error signal may then be generated and a visual error indication presented on the one or more of the screen displays 12 being driven by that symbol generator 16 and, optionally, in any other fashion that will be apparent to the flight crew such as by way of an audible alarm.

The error indication may be visually presented on the display 12 in any suitable manner as a general matter of design choice. As currently contemplated, the graphical display portion or imaged gauge or indicator with respect to which the data error has been detected may be modified or overwritten to evidence that its indications are or may be incorrect, as by rendering a large "X" or "FAIL" or "ERROR" legend over or across the display portion or imaged indicator or by changing the color in which it normally appears. Thus, detected errors in the display data generated by the rendering computer 34 for one or more points of light locations in the graphically-imaged airspeed indicator can be indicated by rendering a large "X" over the location of the graphical airspeed indicator on the display 12. The system may thereafter, either automatically or in response to pilot or operator interaction, discontinue the presentation of that indicator image on the display using the imaging data generated by the controller 16 from which the error was detected, and replace the indicator image on that display with imaging data generated by the controller 16 of the other cockpit display system, so that the same symbol generator 16 will thereafter supply the imaging data for that indicator image to both displays 12A and 12B. Alternatively, the graphical image of the "failed" indicator—bearing a visually-perceptible failure indication—can be maintained on the display 12 which received the unreliable data, with both the pilot and co-pilot thereafter viewing and relying on the display of that instrument on the other screen display 12 of the aircraft dual flight panel display system of the invention. It is also contemplated that, either as a matter of design or operator choice, detection of an error or failure of any subset of the data generated by one of the rendering computers 34 may result in replacement of the entire display field image previously supplied with data from the error-producing rendering computer with the imaging data generated by the other rendering computer 34.

It will therefore be appreciated and readily apparent that a particular advantage presented by the invention is the tremendous reduction in cost, time and effort that is normally required for FAA certification of aircraft flight display systems, as well as the related ability to regularly update and improve the graphical display rendering components of the system to take full advantage of enhancements in available processing power and capabilities at relatively low cost without requiring extensive FAA recertification of the new and improved portions of the system. The inventive system moreover provides enhanced integrity and reliability of the graphically-imaged data by virtue of the relative simplicity of the comparator processor (as contrasted with prior art display flight display systems) since less complex operating code is inherently more trustworthy and reliable.

This disclosure has accordingly described currently-preferred apparatus and methods for implementing the display system of the present invention. Nevertheless, numerous modifications of the hereinabove described apparatus and methods are within the fully intended scope and contemplation of the invention. For example, in lieu of or in addition to the LCD flat panel display(s), the output(s) of one or each rendering computer 34 may be supplied to a head-up display generator for providing to the flight crew or other user a floating or projected virtual image of all of some predetermined portion of the verified data from the rendering computer. Similarly, the size of the liquid crystal, or other imaging technology, display screen can be larger or smaller than the described 9×12 inch panel, and/or may present graphical data at a screen resolution of less than or in excess of the aforementioned 1024×768 pixels.

In currently preferred embodiments of the invention the rendering computer 34 is implemented, as previously described herein, by substantially conventional, commercially-available, off-the-shelf systems typically comprised of general-purpose personal computer hardware and, in some cases, related software for controlling the hardware components and subsystems of the computer hardware. It is nevertheless also within the intended scope of the invention that the rendering computer may be constructed, in whole or in part, of custom or specially-designed components and/or subsystems, and/or associated BIOS and other software, as for example to provide or implement additional functionality or capabilities not generally present in general purpose commercial computer motherboards and/or components and the like, or to facilitate contemplated future updating or replacement of various components and/or subsystems of the rendering computer.

Another contemplated modification relates to the manner in which the comparator processor 32 provides for dynamic verification and assurance of the integrity of the graphical display data that is output by the rendering computer 34 for populating the screen display. As hereinabove described in connection with the currently preferred embodiments, the ultra-high-integrity comparator processor calculates and determines the correct, aliased (i.e. not anti-aliased) values for a predetermined subset of display pixels which are variously located at screen positions on and about the graphical display. The color and/or intensity values of that subset of display pixels, as calculated by the comparator processor, are then compared to the values of the correspondingly-located screen pixels as generated by the rendering computer for output to the LCD display panel or other imaging device to verify that the rendering computer is providing correct, accurate and trustworthy display data upon which the flight crew can confidently rely in their operation of the aircraft.

Those skilled in the art and now having knowledge of the invention by way of this disclosure will appreciate that the high integrity "subset" data which is generated by the comparator processor for use in dynamically verifying the accuracy and trustworthiness of the rendering computer graphical display output can alternatively, or additionally, take on a variety of other forms. For example, the comparator processor can be implemented so as to generate, instead of or in addition to a specific or predetermined multiplicity of the so-called "points of light" which denote individual screen pixel locations, a variety of quickly and easily rendered lines, geometric figures and/or symbols for comparison with the corresponding screen location data which is generated for display by the rendering computer. Similarly, the comparator processor-generated comparison data may comprise or include character, e.g. alphanumeric character, fonts that can compared as a graphical object with the pixel data produced for display by the rendering computer at the corresponding screen locations; the font patterns can be stored for use in memory of the comparator processor and accordingly need not be repeatedly point-by-point recalculated or redrawn by the comparator processor. Likewise, graphical background or generally static objects—such for example as what the rendering computer will graphically image on the display as the simulated dials or bezels and the like of graphically-simulated flight instruments—can be stored as single objects in comparator processor EPROM or other memory and then rapidly and readily loaded into an expanded FIFO for comparison with the rendering computer output for the intended locations of those dials or bezels. Although use by the comparator processor of such line or figure or object data may require additional processing power for comparing the resulting comparison data with the increased number of corresponding rendering computer data points, the integrity of the overall system will be notably enhanced by virtue of the increased number of screen locations being verified for data validity without unduly complicating the design or operation of the comparator processor or notably increasing the efforts needed to satisfy the highest-level requirements for FAA certification of the comparator processor.

The key to the present invention, as implemented in the primary contemplated application of an aircraft flight information graphical display system, is the operational division of the display system into two basic functional parts—one (the rendering computer) which is responsible for display availability or reliability, and the other (the comparator processor) which provides or assures display integrity. The FAA requires that an aircraft primary flight display system must have availability, i.e. reliability, that is comparable to existing systems with a relatively low probability of loss of function. In other words, the system must be sufficiently reliable to assure continuous availability of the data to the flight crew for operating the aircraft. To satisfy this first FAA requirement, the software must be verified to industry standard DO178 level C, which requires that the software must undergo documented testing to assure that it functions properly and that all of the software code is executed during its testing.

The FAA further requires that an aircraft primary flight display system must meet specific levels of integrity—namely, that it be demonstrated that the system cannot output any misleading or unannounced incorrect information. It will be appreciated that the precertification testing necessary to demonstrate and document the satisfaction of this second FAA requirement is much more rigorous than that required to satisfy the first requirement of system availability. Specifically, to evidence integrity the system software must be verified to industry standard DO178 level A, in which all logic paths must be tested with multiple values representing all data values that the system would be expected to see in use, commonly referred to as multiple condition decision coverage or MCDC. In addition, all of the hardware must demonstrate like performance, and the historical development or heritage of the system hardware must be thoroughly documented.

Since the rendering computer of the present invention is operatively responsible solely for display availability, it need only satisfy and be tested to the industry standard DO178 level C standard to achieve the necessary FAA certification, thereby permitting use of relatively complex, commercially-available, off-the-shelf computer systems which can be efficiently and economically verified to the specified DO178 level C standard both as initially utilized and as thereafter upgraded from time-to-time with newly available, enhanced components and capabilities and the like. Thus, use of a rendering computer that requires only the less rigorous DO178 level C testing to achieve FAA certification enables the inventive system to utilize advanced hardware and software with resulting increased display functionality and ready upgradability as enhanced components and subsystems and the like periodically become commercially available after initial installation of the display system.

Display integrity, on the other hand, is provided and assured by the comparator processor which must accordingly be verified to the DO178 level A standard to achieve FAA certification. This will generally require custom-designed hardware and software that must undergo rigorous, extensive, time-consuming and expensive testing and documentation. But because the comparator processor operatively generates, and compares to the rendering processor output, only a relatively small subset of the universe of data that is used to graphically populate and image the display, and further because in the preferred embodiments the comparator processor need not perform anti-aliasing processing of the data that it generates, its operating software and hardware is significantly simplified from that which would be required to generate an entire display screen or region of anti-aliased graphical display data. As a consequence, the hardware and software of the comparator processor can be tested and verified to the more rigorous DO178 level A standard to assure system integrity without unusual difficulty. In addition, because the comparator processor is operative for generating only the subset of comparison display pixel (or object) data, changes or updates of, or enhancements to, the rendering computer will not generally require or warrant any retesting or recertification of the comparator processor, thereby further facilitating future display system upgrades without unanticipated or unusual cost or effort.

While there have shown and described and pointed out fundamental novel features of the invention as applied to preferred embodiments thereof, it will be understood that various omissions and substitutions and changes in the form and details of the systems and components and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An aircraft instrumentation display system for imaging, on a bit-mapped display formed of a multiplicity of individually-addressable pixels at locations throughout the display and actuatable to create images on the display, aircraft flight information based on aircraft and environmental sensor data that is input to the display system, comprising:

a rendering computer operable for graphically rendering the aircraft flight information on the display for use by flight crew of the aircraft in operating the aircraft and for receiving the sensor data and generating from the received sensor data anti-aliased graphical imaging data for selectively actuating the multiplicity of display pixels with the generated anti-aliased graphical imaging data to create on the bit-mapped display the graphically-depicted flight information comprising a plurality of dynamically-changeable graphically-depicted flight parameters, each flight parameter being graphically depicted by rendering computer generated imaging data visibly imaged at a predetermined location on the display by selective actuation of a subject plurality of the pixels of said multiplicity of display pixels to visually form the each graphical flight parameter depiction at the display location; and a comparator processor for receiving the sensor data and generating from the received sensor data comparison imaging data for comparison by said comparator processor with selected parts of the rendering computer generated imaging data for the plural flight parameters to thereby validate the imaging data that is generated by the rendering computer for graphically rendering the flight information on the display, said comparison imaging data corresponding to the rendering computer generated imaging data which is for use in actuating only a predetermined subset of said subject plurality of the pixels of said multiplicity of display pixels for visibly imaging each of the flight parameters at the predetermined location, so that the comparison imaging data comprises imaging data for actuating only said predetermined subset of the said subject plurality of pixels, and said comparator processor being further operable for comparing said comparison imaging data to the corresponding rendering computer generated imaging data for actuating the predetermined subset of said subject plurality of pixels for each of the flight parameters to thereby evaluate the graphically rendered aircraft flight information generated by the rendering computer for presentation on the display by checking, from among all of the imaging data generated by the rendering computer, only a predetermined portion of the rendering computer generated imaging data comprising a meaningful plurality of individual data values of the rendering computer generated imaging data for actuating the predetermined subset of said subject plurality of pixels.

2. An aircraft instrumentation display system in accordance with claim 1, further comprising an input/output processor for receiving and buffering the sensor data for transfer of the buffered sensor data to the rendering computer and to the comparator processor.

3. An aircraft instrumentation display system in accordance with claim 2, further comprising a data transfer bus connecting the rendering computer, the comparator processor and the input/output processor.

4. An aircraft instrumentation display system in accordance with claim 1, wherein the comparison imaging data generated by the comparator processor is not anti-aliased, and wherein the comparator processor comprises means for comparing the not-anti-aliased comparison imaging data to the corresponding rendering computer generated anti-aliased imaging data in a manner so as to enable, by said comparison, validation of the imaging data generated by said rendering computer.

5. An aircraft instrumentation display system in accordance with claim 4, wherein each of said rendering computer generated imaging data and said comparison imaging data comprises color information presented as a plurality of data bits, and wherein said comparing means comprises a comparator for comparing a predetermined number of the plural data bits of said comparison imaging data and of said corresponding rendering computer generated imaging data for validating the imaging data generated by said rendering computer.

6. An aircraft instrumentation display system in accordance with claim 4, wherein each of said rendering computer generated imaging data and said comparison imaging data comprises color information presented as a plurality of data bits, and wherein said comparing means comprises a comparator for comparing a predetermined number of the most-significant bits of said plural data bits of said comparison imaging data and of said corresponding rendering computer generated imaging data for validating the imaging data generated by said rendering computer.

7. An aircraft instrumentation display system in accordance with claim 6, wherein the color information is presented as a data byte comprising 8 data bits, and wherein said predetermined number comprises two.

8. An aircraft instrumentation display system in accordance with claim 4, wherein each of said rendering computer generated imaging data and said comparison imaging data comprises color information presented as a plurality of data bits for each of red, green and blue colors, and wherein said comparing means comprises a comparator for comparing, for each of the colors red, green and blue, a predetermined number of the most-significant bits of said plural data bits of said comparison imaging data and of said corresponding rendering computer generated imaging data for validating the imaging data generated by said rendering computer.

9. An aircraft instrumentation display system in accordance with claim 1, wherein said rendering computer comprises a commercial, general purpose, motherboard-based personal computer having a microprocessor, data storage and a graphics processor, and wherein said comparator processor comprises a custom-designed apparatus having a microprocessor, data storage and a comparator and is specially designed and configured for generating the comparison imaging data and for comparing the comparison imaging data to the corresponding rendering computer generated imaging data.

10. An aircraft instrumentation display system in accordance with claim 1, wherein said comparator processor comprises a buffer for receiving from the rendering computer the rendering computer generated imaging data, and a comparator array for comparing the comparison imaging data generated by the comparator processor to the corresponding rendering computer generated imaging data from said buffer.

11. An aircraft instrumentation display system in accordance with claim 10, wherein said comparator processor further comprises a FIFO stack for receiving and storing the comparison imaging data generated by the comparator processor and for serially providing the stored comparison imaging data from the FIFO stack to said comparator array for comparison of the serially provided comparison imaging data with the corresponding rendering computer generated imaging data from said buffer.

12. An aircraft instrumentation display system in accordance with claim 11, wherein said comparator array comprises a first comparator for comparing an address of a display pixel to be actuated by the corresponding rendering computer generated imaging data in said buffer to a display address of comparison imaging data stored in said FIFO stack, and a second comparator for comparing the comparison imaging data stored in said FIFO stack to the rendering computer generated imaging data in said buffer when said first comparator identifies a successful comparison of said display pixel address and said display address.

13. An aircraft instrumentation display system in accordance with claim 12, wherein each of said rendering computer generated imaging data and said comparison imaging data comprises color information presented as a plurality of data bits, and wherein said second comparator compares a predetermined number of the plural data bits of said comparison imaging data and of said corresponding rendering computer generated imaging data for validating the imaging data generated by said rendering computer.

14. An aircraft instrumentation display system in accordance with claim 10, wherein said comparator processor further comprises a video transmitter for transmitting the rendering computer generated imaging data from said buffer to the display, for graphically rendering the aircraft flight information on the display for use by the flight crew of the aircraft, after said comparing by the comparator array of the comparison imaging data generated by the comparator processor to the corresponding rendering computer generated imaging data from said buffer.

15. An aircraft instrumentation display system in accordance with claim 10, wherein said comparator processor further comprises a video transmitter for transmitting the rendering computer generated imaging data from said buffer to the display, for graphically rendering the plural flight parameters on the display for use by the flight crew of the aircraft, after said comparing by the comparator array of the comparison imaging data generated by the comparator processor to the corresponding rendering computer generated imaging data from said buffer for all of said plural flight parameters.

16. An aircraft instrumentation display system in accordance with claim 1, wherein one of said plural flight parameters is represented on the display by a graphically-presented elongated pointer that rotates about a point defined at one end of the pointer, and wherein the comparison imaging data for said one flight parameter comprises the predetermined subset of pixels for imaging discrete locations along the length of the graphically-presented pointer.

17. An aircraft instrumentation display system in accordance with claim 1, wherein one of said plural flight parameters is represented on the display by a graphically-presented alphanumeric character, and wherein the comparison imaging data for said one flight parameter comprises the predetermined subset of pixels for imaging discrete locations on the graphically-presented alphanumeric character.

18. An aircraft instrumentation display system in accordance with claim 1, wherein said comparator processor further comprises means for generating an error indication to inform the flight crew of a predeterminately unsuccessful comparison by the comparator processor of the comparison imaging data and the corresponding rendering computer generated imaging data.

19. An aircraft instrumentation display system in accordance with claim 18, wherein said error indication is graphically presented on the display so as to be readily visible to the flight crew.

20. A method for imaging, on an aircraft instrumentation display system bit-mapped display formed of a multiplicity of individually-addressable pixels at locations through the display and actuatable to create images on the display, aircraft flight information based on aircraft and environmental sensor data that is input to the display system, comprising the steps of:
generating, by a rendering computer operable for graphically rendering the aircraft flight information on the display for use by flight crew of the aircraft in operating the aircraft and for receiving the sensor data, from the received sensor data anti-aliased graphical imaging data for selectively actuating the multiplicity of display pixels with the generated anti-aliased graphical imaging data to create on the bit-mapped display the graphically-depicted flight information comprising a plurality of dynamically-changeable graphically-depicted flight parameters, each flight parameter being graphically depicted by rendering computer generated imaging data visibly imaged at a predetermined location on the display by selective actuation of a subject plurality of the pixels of said multiplicity of display pixels to visually form the each graphical flight parameter depiction at the display location;
generating, by a comparator processor operable for receiving the sensor data, from the received sensor data comparison imaging data for comparison by the comparator processor with selected parts of the rendering computer generated imaging data for the plural flight parameters to thereby validate the imaging data that is generated by the rendering computer for graphically rendering the flight information on the display, said comparison imaging data corresponding to the rendering computer generated imaging data which is for use in actuating only a predetermined subset of said subject plurality of the pixels of said multiplicity of display pixels for visibly imaging each of the flight parameters at the predetermined location, so that the comparison imaging data comprises imaging data for actuating only said predetermined subset of the said subject plurality of pixels; and
comparing, by the comparator processor, said comparison imaging data to the corresponding rendering computer generated imaging data for actuating the predetermined subset of said subject plurality of pixels for each of the flight parameters to thereby evaluate the graphically rendered aircraft flight information generated by the rendering computer for presentation on the display by checking, from among all of the imaging data generated by the rendering computer, only a predetermined portion of the rendering computer generated imaging data comprising a meaningful plurality of individual data values of the rendering computer generated imaging data for actuating the predetermined subset of said subject plurality of pixels.

21. A method in accordance with claim 20, further comprising the steps of:
receiving and buffering, by an input/output processor, the sensor data; and
transferring the buffered sensor data to the rendering computer and to the comparator processor.

22. A method in accordance with claim 21, wherein said transferring step comprises transferring the buffered sensor data to the rendering computer and to the comparator processor along a bus connecting the input/output processor, the rendering computer and the comparator processor.

23. A method in accordance with claim 20, wherein the comparison imaging data comprises not-anti-aliased imaging data, and wherein said comparing step comprises comparing the not-anti-aliased comparison imaging data to the corresponding rendering computer generated anti-aliased imaging data in a manner so as to enable, by said comparison, validation of the imaging data generated by the rendering computer.

24. A method in accordance with claim 23, wherein each of said rendering computer generated imaging data and said comparison imaging data comprises color information presented as a plurality of data bits, and wherein said comparing step further comprises comparing a predetermined number of the plural data bits of said comparison imaging data and of said corresponding rendering computer generated imaging data for validating the imaging data generated by said rendering computer.

25. A method in accordance with claim 23, wherein each of said rendering computer generated imaging data and said comparison imaging data comprises color information presented as a plurality of data bits, and wherein said comparing step further comprises comparing a predetermined number of the most-significant bits of said plural data bits of said comparison imaging data and of said corresponding rendering computer generated imaging data for validating the imaging data generated by said rendering computer.

26. A method in accordance with claim 25, wherein the color information is presented as a data byte comprising 8 data bits, and wherein said predetermined number comprises two.

27. A method in accordance with claim 23, wherein each of said rendering computer generated imaging data and said comparison imaging data comprises color information presented as a plurality of data bits for each of red, green and blue colors, and wherein said comparing step further comprises comparing, for each of the colors red, green and blue, a predetermined number of the most-significant bits of said plural data bits of said comparison imaging data and of said corresponding rendering computer generated imaging data for validating the imaging data generated by said rendering computer.

28. A method in accordance with claim 20, wherein the rendering computer comprises a commercial, general purpose, motherboard-based personal computer having a microprocessor, data storage and a graphics processor, and wherein the comparator processor comprises a custom-designed apparatus having a microprocessor, data storage and a comparator and is specially designed and configured for said generating of the comparison imaging data and for said comparing of the comparison imaging data to the corresponding rendering computer generated imaging data.

29. A method in accordance with claim 20, further comprising the step of receiving from the rendering computer, in a buffer of the comparator processor, the rendering computer generated imaging data, and wherein said comparing step comprises comparing the comparison imaging data generated by the comparator processor to the corresponding rendering computer generated imaging data from the buffer.

30. A method in accordance with claim 29, further comprising the step of storing, in a FIFO stack of the comparator processor, the comparison imaging data generated by the comparator processor, and wherein said comparing step further comprises serially providing the stored comparison imaging data from the FIFO stack for comparison of the serially-provided comparison imaging data with the corresponding rendering computer generated imaging data from the buffer.

31. A method in accordance with claim 30, wherein said comparing step further comprises comparing an address of a display pixel to be actuated by the corresponding rendering computer generated imaging data in the buffer to a display address of comparison imaging data stored in the FIFO stack, and comparing the comparison imaging data stored in the FIFO stack to the rendering computer generated imaging data in the buffer in response to a successful comparison of the display pixel address and the display address.

32. A method in accordance with claim 31, wherein each of said rendering computer generated imaging data and said comparison imaging data comprises color information presented as a plurality of data bits, and wherein said step of comparing the comparison imaging data stored in the FIFO stack to the rendering computer generated imaging data in the buffer in response to a successful comparison of the display pixel address and the display address comprises comparing a predetermined number of the plural data bits of said comparison imaging data and of said corresponding rendering computer generated imaging data for validating the imaging data generated by said rendering computer.

33. A method in accordance with claim 29, further comprising the step of transmitting the rendering computer generated imaging data from the buffer to the display, for graphically rendering the aircraft flight information on the display for use by the flight crew of the aircraft, after said step of comparing the comparison imaging data generated by the comparator processor to the corresponding rendering computer generated imaging data from the buffer.

34. A method in accordance with claim 29, further comprising the step of transmitting the rendering computer generated imaging data from the buffer to the display, for graphically rendering the plural flight parameters on the display for use by the flight crew of the aircraft, after said step of comparing the comparison imaging data generated by the comparator processor to the corresponding rendering computer generated imaging data from said buffer for all of said plural flight parameters.

35. A method in accordance with claim 20, wherein one of said plural flight parameters is represented on the display by a graphically-presented elongated pointer that rotates about a point defined at one end of the pointer, and wherein the comparison imaging data for said one flight parameter comprises the predetermined subset of pixels for imaging discrete locations along the length of the graphically-presented pointer.

36. A method in accordance with claim 20, wherein one of said plural flight parameters is represented on the display by a graphically-presented alphanumeric character, and wherein the comparison imaging data for said one flight parameter comprises the predetermined subset of pixels for imaging discrete locations on the graphically-presented alphanumeric character.

37. A method in accordance with claim 20, further comprising the step of generating an error indication in response to a predeterminately unsuccessful comparison of the comparison imaging data and the corresponding rendering computer generated imaging data to thereby inform the flight crew of a validation failure of the rendering computer generated imaging data.

38. A method in accordance with claim 37, wherein said step of generating an error indication comprises graphically presenting on the display a visual error indication.

\* \* \* \* \*